United States Patent
Dai et al.

(10) Patent No.: US 8,861,500 B2
(45) Date of Patent: Oct. 14, 2014

(54) METHOD AND DEVICE FOR DETECTING DOWNLINK CONTROL INFORMATION

(75) Inventors: Bo Dai, Guangdong Province (CN); Xin Wu, Guangdong Province (CN); Ping Zeng, Guangdong Province (CN); Zhisong Zuo, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 211 days.

(21) Appl. No.: 13/257,660

(22) PCT Filed: Jun. 30, 2010

(86) PCT No.: PCT/CN2010/074845
§ 371 (c)(1),
(2), (4) Date: May 18, 2012

(87) PCT Pub. No.: WO2010/149106
PCT Pub. Date: Dec. 29, 2010

(65) Prior Publication Data
US 2012/0263052 A1    Oct. 18, 2012

(30) Foreign Application Priority Data

Jan. 8, 2010   (CN) .......................... 2010 1 0002227

(51) Int. Cl.
*H04J 3/00*   (2006.01)
*H04L 5/00*   (2006.01)
*H04W 24/00*  (2009.01)
*H04W 48/16*  (2009.01)

(52) U.S. Cl.
CPC .............. *H04L 5/001* (2013.01); *H04L 5/0053* (2013.01); *H04L 5/0096* (2013.01); *H04L 5/0023* (2013.01); *H04W 24/00* (2013.01); *H04W 48/16* (2013.01); *H04L 5/0064* (2013.01)

USPC ......................................................... 370/345

(58) Field of Classification Search
CPC .............................. H04L 5/003; H04L 1/0026
USPC .................. 370/310, 328, 329, 343, 345, 350
See application file for complete search history.

(56) References Cited

U.S. PATENT DOCUMENTS

2010/0098051 A1*   4/2010   Uemura ........................ 370/350
2011/0286397 A1*   11/2011  Kim et al. .................... 370/328

FOREIGN PATENT DOCUMENTS

CN       101572895 A    11/2009
WO       9638938 A2     12/1996

OTHER PUBLICATIONS

R1-094571 3GPP TSG RAN WG1 Meeting #59, Nov. 9-13, 2009, Jeju, Korea, See pp. 1-3.
Research in Motion UK Limited, Blind Decoding for Carrier Aggregation, 3GPP TSGRAN WG1 Meeting #59, R1-094459, Nov. 9-13, 2009.

(Continued)

*Primary Examiner* — Raj Jain
(74) *Attorney, Agent, or Firm* — Ling Wu; Stephen Yang; Ling and Yang Intellectual Property

(57) ABSTRACT

The present invention provides a method and device for detecting downlink control information, which relates to the communication field. The method includes: during cross carrier scheduling, the user equipment (UE) determines a search space for monitoring a physical downlink control channel (PDCCH) according to the number of downlink component carriers in a PDCCH Monitoring Set and the number of downlink component carriers in a UE DL Component Carrier Set.

16 Claims, 1 Drawing Sheet

(56) References Cited

OTHER PUBLICATIONS

ZTE, PDCCH Blind Decoding and Search Space for Carrier Aggregation of LTE-A, 3GPP TSG-RAN WG1 #60, R1-100958, Feb. 22-26, 2010.

International Search Report for PCT/CN2010/074845 dated Sep. 3, 2010.
"PDCCH monitoring set"; 7.2.1.1. Samsung, Discussion and decision; 3GPP TSG RAN WG1 Meeting #59 Jeju, Korea, Nov. 9-13, 2009; R1-094571.

* cited by examiner

METHOD AND DEVICE FOR DETECTING DOWNLINK CONTROL INFORMATION

TECHNICAL FIELD

The present invention relates to the communication field, and particularly, to a method and device for detecting downlink control information.

BACKGROUND OF THE RELATED ART

The radio frame in the long term evolution (LTE) system includes frame structures of frequency division duplex (FDD) mode and time division duplex (TDD) mode. The frame structure of FDD mode is as shown in FIG. 1, wherein one 10 ms radio frame is composed of twenty slots with the length thereof being 0.5 ms and numbered as 0-19, and slots $2i$ and $2i+1$ form a subframe i with the length thereof being 1 ms. The frame structure of TDD mode is as shown in FIG. 2, wherein one 10 ms radio frame is composed of two half frames with the length thereof being 5 ms, one half frame includes 5 subframes with the length thereof being 1 ms, and subframe i is defined as 2 slots $2i$ and $2i+1$ with the length thereof being 0.5 ms. In the above two frame structures, as to normal cyclic prefix (Normal CP), one slot includes 7 symbols with the length thereof being 66.7 us, wherein the CP length of the first symbol is 5.21 us, and the CP length of the remaining 6 symbols is 4.69 us; and as to an extended cyclic prefix (Extended CP), one slot includes 6 symbols, and the CP length of all the symbols is 16.67 us.

The release number of LTE corresponds to Release 8 (R8), and added release corresponds to the release number of Release 9 (R9), and as to the subsequent LTE-Advance, its release number is Release 10 (R10). The following three physical downlink control channel are defined in LTE: Physical Control Format Indicator Channel (PCFICH), Physical Hybrid Automatic Retransmission Request Indicator Channel (PHICH), and Physical Downlink Control Channel (PDCCH).

In this case, the information carried by PCFICH is used for indicating the number of orthogonal frequency division multiplexing (OFDM) symbols of the PDCCH transmitted in one subframe and it is sent on the first OFDM symbol of the subframe, and the frequency location thereof is determined by the system downlink bandwidth and the cell identity (ID).

PHICH is used for carrying Acknowledge/Non-acknowledge (ACK/NACK) feedback information of the uplink transmission data. The number and time frequency location of PHICH can be determined by the system message and cell ID in a physical broadcast channel (PBCH) of a downlink carrier where PHICH is located.

PDCCH is used for carrying downlink control information (DCI), including uplink/downlink scheduling information and uplink power control information. The formats of DCI are classified as: DCI format 0, DCI format 1, DCI format 1A, DCI format 1B, DCI format 1C, DCI format 1D, DCI format 2, DCI format 2A, DCI format 3, DCI format 3A and so on, wherein DCI format 0 is used for indicating the scheduling of the physical uplink shared channel (PUSCH);

DCI format 1, DCI format 1A, DCI format 1B, DCI format 1C, DCI format 1D are used for different modes of scheduling one PDSCH codeword;

DCI format 2, DCI format 2A, and DCI format 2B are used for different modes of space division multiplexing;

DCI format 3 and DCI format 3A are used for different modes of power control instructions of physical uplink control channel (PUCCH) and PUSCH.

In this case, the sizes of DCI format 3 and 3A are consistent with that of DCI format 0. In this case, in DCI format 3, two continuous bits are used for indicating the transmit power control (TPC) commands of PUCCH and PUSCH, a high layer signaling (tpc-Index) designates the starting position of the TPC command of a certain user, while in DCI format 3A, 1 bit is used for indicating the transmit power control (TPC) commands of PUCCH and PUSCH, and a high layer signaling (tpc-Index) designates the starting position of the TPC command of a certain user.

In pariticular, DCI format 3 employs 2 bits to transmit the TPC command for PUCCH and PUSCH, and the following information is indicated by DCI format 3:

TPC command 1, TPC command 2, . . . , TPC command N
In this case, $$N = \left\lfloor \frac{L_{format0}}{2} \right\rfloor,$$

$L_{format\,0}$ is equal to the size before DCI format 0 adds cyclical redundancy check (CRC), including any added bits, and $\lfloor\ \rfloor$ represents round down. And, the parameter tpc-Index provided by the high layer signaling is used for designating the index of the TPC command for a certain user.

If $$\left\lfloor \frac{L_{format\,0}}{2} \right\rfloor < \frac{L_{format\,0}}{2},$$

then one 0 bit will be added into DCI format 3.

In pariticular, DCI format 3A employs 1 bit to transmit the TPC command for PUCCH and PUSCH, and the following information is indicated by DCI format 3A:

TPC command 1, TPC command 2, . . . , TPC command M
In this case, $M=L_{format\,0}$, $L_{format\,0}$ is equal to the size before DCI format 0 adds CRC, including any added bits. And, the parameter tpc-Index provided by the high layer signaling is used for designating the index of the TPC command for a certain user.

The physical resources transmitted by the physical downlink control channel (PDCCH) are in the unit of control channel element (CCE), and the size of one CCE is 9 resource element groups (REG), i.e. 36 resource elements (RE), and one PDCCH may occupy 1, 2, 4, or 8 CCEs. As to the sizes of these four types of PDCCHs occupying 1, 2, 4, or 8 CCEs, tree aggregation is used, i.e. the PDCCH occupying 1 CCE can start from any CCE location; the PDCCH occupying 2 CCEs starts from even CCE location; the PDCCH occupying 4 CCEs starts from the CCE location which is an integral multiple of 4; and the PDCCH occupying 8 CCEs starts from the CCE location which is an integral multiple of 8.

Each aggregation level defines one search space, including common search space and user equipment-specific (UE-Specific) search space. The number of CCEs of the entire search space is determined by the number of OFDM symbols occupied by the control area indicated by PCFICH in each downlink subframe and the number of PHICH groups. UE carries out blind detection on all the possible PDCCH code rates according to the DCI formats of the transmission modes in the search space.

In the kth subframe, the control domain carrying PDCCH is composed of a group of $N_{CCE,k}$ CCEs numbered from 0 to $N_{CCE,k}-1$. UE should detect a group of PDCCH candidates in each non-discontinuous reception (non-DRX) subframes so as to acquire control information, and detection refers to decoding the PDCCHs in the group according to all the DCI formats to be detected. The PDCCH candidates to be detected is defined in the manner of search space, and as to aggregation level $L \in \{1, 2, 4, 8\}$, the search space $S_k^{(L)}$ is defined by a group of PDCCH candidates. The CCE corresponding to PDCCH candidate m in the search space $S_k^{(L)}$ is defined according to the following formula:

$$L \cdot \{(Y_k+m) \bmod \lfloor N_{CCE,k}/L \rfloor\}+i,$$

wherein $i=0, L, L-1$ $m=0, L, M^{(L)}-1$, $M^{(L)}$ is the number of PDCCH candidates to be detected in the search space $S_k^{(L)}$.

As to common search space, $Y_k=0$, L takes the values of 4 and 8.

As to UE-specific search space, L takes the values of 1, 2, 4, and 8.

$$Y_k=(A \cdot Y_{k-1}) \bmod D,$$

wherein $Y_{-1}=n_{RNTI} \neq 0$, $A=39827$, $D=65537$, $k=\lfloor n_s/2 \rfloor$, $n_s$ is a slot number in one radio frame. $n_{RNTI}$ is a corresponding RNTI (Radio Network Temporary Identifier).

UE should detect one common search space with the aggregation levels thereof being 4 and 8 respectively and one UE-specific search space with the aggregation levels thereof being 1, 2, 4 and 8 respectively, and the common search space and UE-specific search space may be overlapped. The particular number of detections and the corresponding search space are as shown in Table 1:

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

UE is semi-statically configured to receive the PDSCH data transmission according to the indication of PDCCH of the UE-specific search space based on one of the following transmission modes by way of a high layer signaling:

Mode 1: Single-antenna port; port 0

Mode 2: Transmit diversity p Mode 3: Open-loop spatial multiplexing

Mode 4: Closed-loop spatial multiplexing

Mode 5: Multi-user MIMO

Mode 6: Closed-loop Rank=1 pre-coding

Mode 7: Single-antenna port; port 5

If the UE is configured by the high layer to perform the PDCCH decoding by using the cyclical redundancy check (CRC) scrambled by cell radio network temporary identifier (C-RNTI), then the UE shall decode the PDCCH and all the relevant PDSCHs according to the corresponding combination defined in Table 2:

TABLE 2

| UE downlink transmission mode | DCI format | Search space | Corresponding PDSCH transmission solution of PDCCH |
|---|---|---|---|
| Mode 1 | DCI format 1A | UE specific defined by Common and C-RNTI | Single-antenna port, port 0 |
|  | DCI format 1 | UE specific defined by C-RNTI | Single-antenna port, port 0 |
| Mode 2 | DCI format 1A | UE specific defined by Common and C-RNTI | Transmit diversity |
|  | DCI format 1 | UE specific defined by C-RNTI | Transmit diversity |
| Mode 3 | DCI format 1A | UE specific defined by Common and C-RNTI | Transmit diversity |
|  | DCI format 2A | UE specific defined by C-RNTI | Open-loop spatial multiplexing or transmit diversity |
| Mode 4 | DCI format 1A | UE specific defined by Common and C-RNTI | Transmit diversity |
|  | DCI format 2 | UE specific defined by C-RNTI | Closed-loop spatial multiplexing or transmit diversity |
| Mode 5 | DCI format 1A | UE specific defined by Common and C-RNTI | Transmit diversity |
|  | DCI format 1D | UE specific defined by C-RNTI | Multi-user MIMO |
| Mode 6 | DCI format 1A | UE specific defined by Common and C-RNTI | Transmit diversity |
|  | DCI format 1B | UE specific defined by C-RNTI | Closed-loop Rank = 1 precoding |
| Mode 7 | DCI format 1A | UE specific defined by Common and C-RNTI | If the number of PBCH antenna ports is 1, employ a Single-antenna port, port 0 Otherwise, transmit diversity |
|  | DCI format 1 | UE specific defined by C-RNTI | Single-antenna port, port 5 |
| Mode 8 | DCI format 1A | UE specific defined by Common and C-RNTI | If the number of PBCH antenna ports is 1, employ a Single-antenna port, port 0 Otherwise, transmit diversity |
|  | DCI format 2B | UE specific defined by C-RNTI | dual-layer transmission, port 7 and 8, or Single-antenna port, port 7 or 8 |

If the UE is configured by the high layer to perform the PDCCH decoding by using the CRC scrambled by the semi-persistently scheduled cell radio network temporary identifier (SPS C-RNTI), then the UE shall decode the PDCCH and all the relevant PDSCHs according to the corresponding combination defined in Table 3:

TABLE 3

| UE downlink transmission mode | DCI format | Search space | Corresponding PDSCH transmission solution of PDCCH |
|---|---|---|---|
| Mode 1 | DCI format 1A | UE specific defined by Common and C-RNTI | Single-antenna port, port 0 |
|  | DCI format 1 | UE specific defined by C-RNTI | Single-antenna port, port 0 |
| Mode 2 | DCI format 1A | UE specific defined by Common and C-RNTI | Transmit diversity |

TABLE 3-continued

| UE downlink transmission mode | DCI format | Search space | Corresponding PDSCH transmission solution of PDCCH |
|---|---|---|---|
| | DCI format 1 | UE specific defined by C-RNTI | Transmit diversity |
| Mode 3 | DCI format 1A | UE specific defined by Common and C-RNTI | Transmit diversity |
| | DCI format 2A | UE specific defined by C-RNTI | Transmit diversity |
| Mode 4 | DCI format 1A | UE specific defined by Common and C-RNTI | Transmit diversity |
| | DCI format 2 | UE specific defined by C-RNTI | Transmit diversity |
| Mode 5 | DCI format 1A | UE specific defined by Common and C-RNTI | Transmit diversity |
| Mode 6 | DCI format 1A | UE specific defined by Common and C-RNTI | Transmit diversity |
| Mode 7 | DCI format 1A | UE specific defined by Common and C-RNTI | Single-antenna port, port 5 |
| | DCI format 1 | UE specific defined by C-RNTI | Single-antenna port, port 5 |
| Mode 8 | DCI format 1A | UE specific defined by Common and C-RNTI | Single-antenna port, port 7 |
| | DCI format 2B | UE specific defined by C-RNTI | Single-antenna port, port 7 or 8 |

If the UE is configured by the high layer to perform the PDCCH decoding by using the CRC scrambled by transmit power control—PUCCH—cell radio network temporary identifier (TPC-PUCCH-RNTI), then the UE shall decode the PDCCH according to the corresponding combination defined in Table 4:

TABLE 4

| DCI format | Search space |
|---|---|
| DCI format 3/3A | Common search space |

If the UE is configured by the high layer to perform the PDCCH decoding by using the CRC scrambled by transmit power control—PUSCH—cell radio network temporary identifier (TPC-PUSCH-RNTI), then the UE shall decode the PDCCH according to the corresponding combination defined in Table 5:

TABLE 5

| DCI format | Search space |
|---|---|
| DCI format 3/3A | Common search space |

Since the LTE-Advanced network needs to be able to access the LTE users, the operating frequency band thereof needs to cover the current LTE frequency band, and there is already no continuous 100 MHz frequency spectrum bandwidth which can be allocated on this frequency band, one direct technology to be solved by LTE-Advanced is to aggregate several continuous component carriers (frequency spectrum) distributed in different frequency bands by using the carrier aggregation technology to form a 100 MHz bandwidth which can be used by LTE-Advanced. That is, as to the aggregated frequency spectrum, it is divided into n component carriers (frequency spectrums), and the frequency spectrum in each component carrier (frequency spectrum) is continuous.

3GPP provides a PDCCH Monitoring Set (PDCCH Monitoring Set), including downlink component carriers and belongs to a UE DL Component Carrier Set. The user has to monitor the PDCCH on this downlink component carrier. In an LTE-Advanced system, the use of carrier aggregation enables that one downlink component carrier may correspond to a plurality of uplink component carriers, which is different from the situation that only one downlink carrier corresponds to one uplink carrier in the LTE system. And, the method for the blind detection of PDCCH is also different. Moreover, there is still no blind detection method for PDCCH in the related art, which brings inconvenience to the practical application.

SUMMARY OF THE INVENTION

The method and device for detecting downlink control information provided by the present invention are used for managing the blink detection of PDCCH in the carrier aggregation system.

In order to achieve the purpose of the above invention, the present invention provides the following technical solution:

a method for detecting downlink control information comprises:

during cross carrier scheduling, user equipment (UE) determines a search space for monitoring a physical downlink control channel (PDCCH) according to the number of downlink component carriers in a UE DL Component Carrier Set and the number of downlink component carriers in a PDCCH Monitoring Set.

Preferably, the above method further has the following features:

the step of determining the search space for monitoring the PDCCH comprises:

if the number of downlink component carriers in the PDCCH Monitoring Set and the number of downlink component carriers in the UE DL Component Carrier Set are equal, the search space for the user equipment to monitor the PDCCH is consistent with that for single carrier scheduling; and if the number of downlink component carriers in the PDCCH Monitoring Set and the number of downlink component carriers in the UE DL Component Carrier Set are unequal, the search space for the user equipment to monitor the PDCCH on carriers which can carry out cross carrier scheduling will be enlarged.

Preferably, the above method further has the following features:

the enlarged search space is user-specific search space.

Preferably, the above method further has the following features:

equal search space is enlarged for each downlink component carrier which carries out cross carrier scheduling in the PDCCH Monitoring Set.

Preferably, the above method further has the following features:

the enlarged search space is determined by the enlarged number of times of monitoring of each downlink component carrier which can carry out the cross carrier scheduling, wherein the enlarged number of times of monitoring is determined according to difference between the number of the downlink component carriers in the PDCCH Monitoring Set and the number of the downlink component carriers in the UE DL Component Carrier Set.

Preferably, the above method further has the following features:
the enlarged number of times of monitoring is $$\left\lfloor \frac{(M-L) \times N}{P} \right\rfloor,$$

wherein, M is the number of downlink component carriers in the UE DL Component Carrier Set, L is the number of downlink component carriers in the PDCCH Monitoring Set, P is the number of downlink component carriers which can carry out cross carrier scheduling in the PDCCH Monitoring Set, and N is the maximum number of times of monitoring of each downlink component carrier when the cross carrier scheduling is not carried out.

Preferably, the above method further has the following features:
allocating the search space corresponding to the enlarged number of times of monitoring to each downlink component carrier which can carry out cross carrier scheduling is implemented by way of the following method:
selecting H aggregation levels from aggregation levels 1, 2, 4 and 8 in the DE-specific search space, and adding A PDCCH candidates in each selected aggregation level respectively, $$A = \left\lfloor \frac{\left\lfloor \frac{(M-L) \times N}{P} \right\rfloor}{H \times B} \right\rfloor \text{ or}$$

$$A = \left\lfloor \frac{\frac{(M-L) \times N}{P}}{H \times B} \right\rfloor$$

wherein H∈{1, 2, 3, 4}, B is the number of downlink control information formats (DCI format) under each transmission mode.

Preferably, the above method further has the following features:
if downlink component carrier A can carry out cross carrier scheduling, the user equipment detects the downlink control information corresponding to all or part of the downlink component carriers which can be scheduled by the downlink component carrier A in the enlarged search space on the downlink component carrier A.

Preferably, the above method further has the following features:
the downlink control information corresponding to all or part of the downlink component carriers which can be scheduled by the downlink component carrier A is sent by the base station in the enlarged search space on the downlink component carrier A.

Preferably, the above method further has the following features:
if the downlink component carrier b can carry out cross carrier scheduling and can schedule h downlink component carriers, the search space of the downlink component carrier b is enlarged to h search spaces, wherein there is an one-to-one correspondence between the h search spaces and the h downlink component carriers.

Preferably, the above method further has the following features:
locations of the h search spaces are continuous, or the locations of the h search spaces are produced according to a downlink component carrier index corresponding to the search space.

Preferably, the above method further has the following features:
the user equipment detects the downlink control information of the downlink component carrier corresponding to the search space on the enlarged search space.

Preferably, the above method further has the following features:
the downlink control information of downlink component carrier Y is sent by a base station by way of the search space corresponding to the downlink component carrier Y, wherein the downlink component carrier Y is any one of the h downlink component carriers.

A device for detecting downlink control information applied in user equipment is configured to: during cross carrier scheduling, determine a search space for monitoring a physical downlink control channel (PDCCH) according to the number of downlink component carriers in a PDCCH Monitoring Set and the number of downlink component carriers in a UE DL Component Carrier Set.

Preferably, the device further has the following features:
the device is configured to:
if the number of downlink component carriers in the PDCCH Monitoring Set and the number of downlink component carriers in the UE DL Component Carrier Set are equal, set the search space for monitoring the PDCCH to be consistent with that for single carrier scheduling; and
if the number of downlink component carriers in the PDCCH Monitoring Set and the number of downlink component carriers in the UE DL Component Carrier Set are unequal, enlarge the search space for monitoring the PDCCH on carriers which can carry out cross carrier scheduling.

Preferably, the device further has the following features:
the enlarged search space is user-specific search space.

Preferably, the device further has the following features:
the device is configured to: enlarge equal search space for each downlink component carrier which carries out cross carrier scheduling in the PDCCH Monitoring Set.

Preferably, the device further has the following features:
the enlarged search space is determined by the enlarged number of times of monitoring of each downlink component carrier which can carry out cross carrier scheduling, wherein the enlarged number of times of monitoring is determined according to difference between the number of the downlink component carriers in the PDCCH Monitoring Set and the number of the downlink component carriers in the UE DL Component Carrier Set.

Preferably, the device further has the following features:
the enlarged number of times of monitoring is $$\left\lfloor \frac{(M-L) \times N}{P} \right\rfloor,$$

wherein, M is the number of downlink component carriers in the UE DL Component Carrier Set, L is the number of downlink component carriers in the PDCCH Monitoring Set, P is the number of downlink component carriers which can carry out cross carrier scheduling in the PDCCH Monitoring Set, and N is the maximum number of times of monitoring of each downlink component carrier when the cross carrier scheduling is not carried out.

Preferably, the device further has the following features:
the device is configured to: allocate the search space corresponding to the enlarged number of times of monitoring to said each downlink component carrier which can carry out cross carrier scheduling is implemented by way of the following method:

selecting H aggregation levels from aggregation levels 1, 2, 4 and 8 in the UE-specific search space, and adding A PDCCH candidates in each selected aggregation level respectively, $$A = \left\lfloor \frac{\left\lfloor \frac{(M-L) \times N}{P} \right\rfloor}{H \times B} \right\rfloor$$

or $$A = \left\lfloor \frac{\frac{(M-L) \times N}{P}}{H \times B} \right\rfloor$$

where H $\in \{1, 2, 3, 4\}$, B is the number of downlink control information formats (DCI format) under each transmission mode.

Preferably, the device further has the following features:
the device is further configured to: if downlink component carrier A can carry out cross carrier scheduling, detect the downlink control information corresponding to all or part of the downlink component carriers which can be scheduled by the downlink component carrier A in the enlarged search space on the downlink component carrier A.

Preferably, the device further has the following features:
the downlink control information corresponding to all or part of the downlink component carriers which can be scheduled by the downlink component carrier A is sent by the base station in the enlarged search space of the downlink component carrier A.

Preferably, the device further has the following features:
the device is configured to: if the downlink component carrier b can carry out cross carrier scheduling and can schedule h downlink component carriers, enlarge the search space of the downlink component carrier b to h search spaces, wherein there is an one-to-one correspondence between the h search spaces and the h downlink component carriers.

Preferably, the device further has the following features:
the locations of the h search spaces are continuous, or the locations of the h search spaces are produced according to a downlink component carrier index corresponding to the search space.

Preferably, the device further has the following features:
detecting the downlink control information of the downlink component carrier corresponding to the search space in the enlarged search space.

Preferably, the device further has the following features:
the downlink control information of the downlink component carrier Y is sent by a base station by way of the search space corresponding to the downlink component carrier Y, wherein the downlink component carrier Y is any one of said h downlink component carriers.

In the technical solution provided by the present invention, the search space for monitoring the PDCCH is determined according to the number of downlink component carriers in the PDCCH Monitoring Set and the number of downlink component carriers in the UE DL Component Carrier Set.

PREFERRED EMBODIMENTS OF THE PRESENT INVENTION

Hereinafter, the technical solution provided by the embodiments of the present invention will be further described in conjunction with the accompanying drawings.

In the related art, in the LTE, the user needs to monitor the PDCCH on one carrier, however, in the LTE-Advance, the user need to carry out PDCCH bind detection on all the downlink component carriers in the PDCCH Monitoring Set.

In R10, the number of downlink component carriers in the UE DL Component Carrier Set is M, the number of downlink component carriers which require the user to carry out blind detection thereon in the PDCCH Monitoring Set is L, in the PDCCH Monitoring Set, the number of downlink component carriers which can carry out cross carrier scheduling is P. When not carrying out cross carrier scheduling, the maximum number of blind detections of each downlink component carrier is N, wherein the preferred value of N is 44 or 60.

When it is required to carry out cross carrier scheduling, the maximum number of blind detections of each downlink component carrier in the PDCCH Monitoring Set is $$\frac{M \times N}{L}.$$

Figure 1:
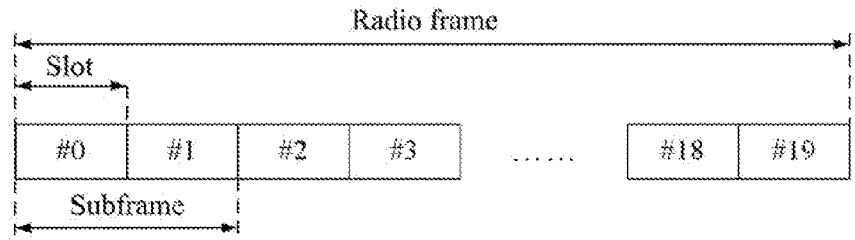
FIG. 1 is a schematic diagram of a frame structure of an FDD mode in the related art.
Figure 2:
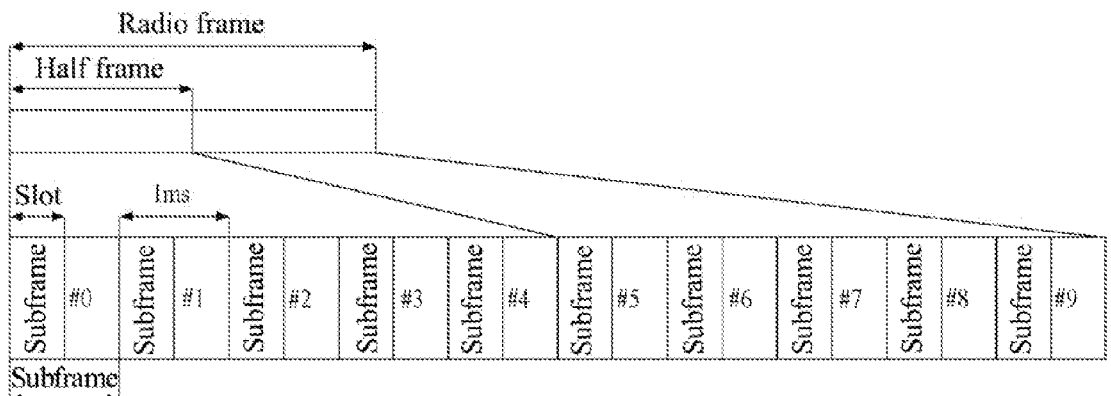
FIG. 2 is a schematic diagram of a frame structure of a TDD mode in the related art.
Figure 3:
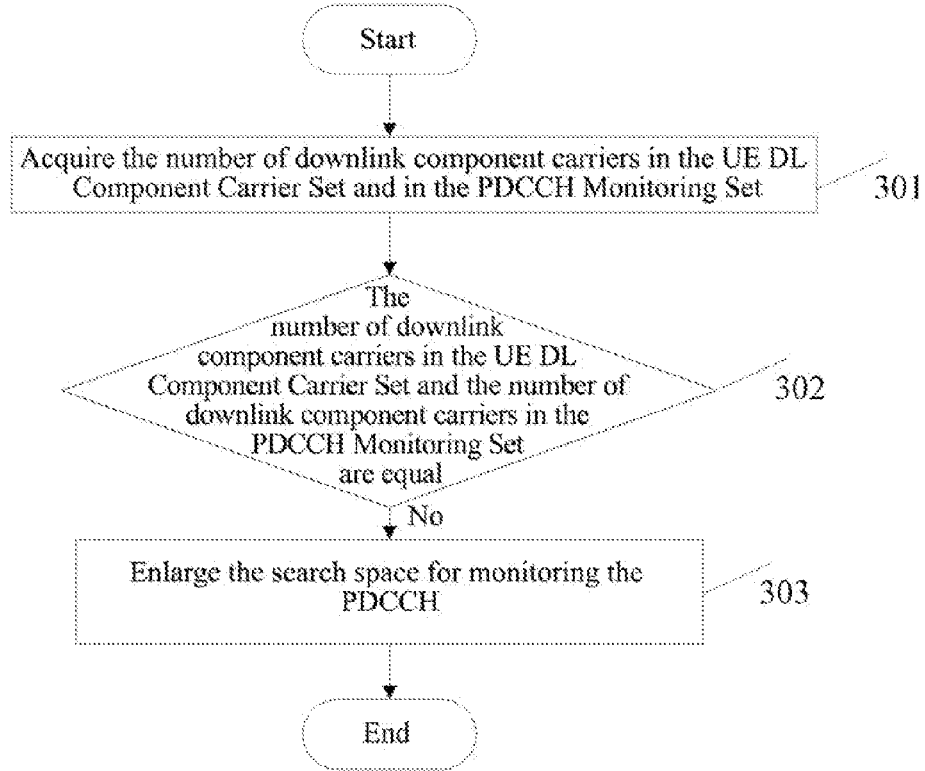
FIG. 3 is a flowchart of a method for managing downlink control information provided by the present invention.

Hereinafter, the method for detecting downlink control information will be described, as shown in FIG. 3:

Step 301: the numbers of downlink component carriers in the UE DL Component Carrier Set and in the PDCCH Monitoring Set are acquired.

Step 302: it is judged whether the number of downlink component carriers in the UE DL Component Carrier Set and the number of downlink component carriers in the PDCCH Monitoring Set are equal;

if they are equal, i.e. the UE DL Component Carrier Set and the PDCCH Monitoring Set are equal in size, the maximum number of blind detections of each component carrier in the PDCCH Monitoring Set is the same as that when the cross carrier scheduling is not carried out, which is equal to N, the blind detection of UE on PDCCH is managed by the UE-specific search space in the related art, which need not be described herein.

If unequal, proceed to step 303.

Step 303: the search space for monitoring the PDCCH is enlarged.

The following embodiments are described by taking enlarging the UE-specific search space as an example:

Embodiment I

If the UE DL Component Carrier Set and the PDCCH Monitoring Set are unequal in size, as compared to the maximum number of blind detections when the cross carrier scheduling is not carried out, the maximum number of blind detections of each component carrier which carries out the cross carrier scheduling in the PDCCH Monitoring Set is increased by $$\left\lfloor \frac{(M-L) \times N}{P} \right\rfloor.$$

Herein, the UE increasing the number of blind detections is equivalent to enlarging the search space of PDCCH blind detection.

Since the number of blind detections is increased by $$\left\lfloor \frac{(M-L) \times N}{P} \right\rfloor,$$

the number of blind detections can be achieved by enlarging the search space of different aggregation levels under the UE-specific search space.

In the present invention, there will be the following configurations about how to add the enlarged number of blind detections by $$\left\lfloor \frac{(M-L) \times N}{P} \right\rfloor$$

to these aggregation levels through enlarging the search space of H aggregation levels under the UE-specific search space:

Configuration I:

when the value of H is 4, the maximum number of blind detections of each component carrier which can carry out cross carrier scheduling in the PDCCH Monitoring Set is increased by $$\left\lfloor \frac{(M-L) \times N}{P} \right\rfloor,$$

and they will be allocated to four aggregation levels under the UE-specific search space, i.e. each aggregation level which the enlarged number of blind detections is allocated to will increase $$A = \left\lfloor \frac{\left\lfloor \frac{(M-L) \times N}{P} \right\rfloor}{H \times B} \right\rfloor$$

or $$A = \left\lfloor \frac{\frac{(M-L) \times N}{P}}{H \times B} \right\rfloor PDCCH$$

candidates on the basis of not carrying out cross carrier scheduling originally, wherein H is equal to 4, and B is the number of DCI formats included under each transmission mode. As shown in Table 6:

TABLE 6

| Type | Search space $S_k^{(L)}$ Aggregation level L | Size [in CCEs] | Number of PDCCH candidates $M^{(L)}$ |
|---|---|---|---|
| UE-specific | 1 | 6 + A | 6 + A |
|  | 2 | 12 + 2A | 6 + A |
|  | 4 | 8 + 4A | 2 + A |
|  | 8 | 16 + 8A | 2 + A |
| Common | 4 | 16 | 4 |
|  | 8 | 16 | 2 |

Configuration II:

when the value of H is 3, the enlarged number of blind detections $$\left\lfloor \frac{(M-L) \times N}{P} \right\rfloor$$

will be allocated to three aggregation levels under the UE-specific search space, i.e. each aggregation which the enlarged number of blind detections is allocated to will increase $$A = \left\lfloor \frac{\left\lfloor \frac{(M-L) \times N}{P} \right\rfloor}{H \times B} \right\rfloor$$

or $$A = \left\lfloor \frac{\frac{(M-L) \times N}{P}}{H \times B} \right\rfloor PDCCH$$

candidates on the basis of not carrying out cross carrier scheduling originally, wherein H is equal to 3, and B is the number of DCI formats included under each transmission mode. These three aggregation levels can be a combination of any three of aggregation levels 1, 2, 4 and 8, for example, allocating it to aggregation levels 1, 2 and 4, as shown in Table 7:

TABLE 7

| Type | Search space $S_k^{(L)}$ Aggregation level L | Size [in CCEs] | Number of PDCCH candidates $M^{(L)}$ |
|---|---|---|---|
| UE-specific | 1 | 6 + A | 6 + A |
|  | 2 | 12 + 2A | 6 + A |
|  | 4 | 8 + 4A | 2 + A |
|  | 8 | 16 | 2 |
| Common | 4 | 16 | 4 |
|  | 8 | 16 | 2 |

Configuration III:

when the value of H is 2, the enlarged number of blind detections $$\left\lfloor \frac{(M-L) \times N}{P} \right\rfloor$$

will be allocated to two aggregation levels under the UE-specific search space, i.e. each aggregation which the enlarged number of blind detections is allocated to will increase $$A = \left\lfloor \frac{\left\lfloor \frac{(M-L) \times N}{P} \right\rfloor}{H \times B} \right\rfloor$$

or $$A = \left\lfloor \frac{\frac{(M-L) \times N}{P}}{H \times B} \right\rfloor$$

PDCCH candidates on the basis of not carrying out cross carrier scheduling originally, wherein H is equal to 2, and B is the number of DCI formats included under each transmission mode. These two aggregation levels can be a combination of any two of aggregation levels 1, 2, 4 and 8, for example, allocating it to aggregation levels 1 and 2, as shown in Table 8:

TABLE 8

| Type | Search space $S_k^{(L)}$ Aggregation level L | Size [in CCEs] | Number of PDCCH candidates $M^{(L)}$ |
|---|---|---|---|
| UE-specific | 1 | 6 + A | 6 + A |
|  | 2 | 12 + 2A | 6 + A |
|  | 4 | 8 | 2 |
|  | 8 | 16 | 2 |
| Common | 4 | 16 | 4 |
|  | 8 | 16 | 2 |

Configuration IV:

when the value of H is 1, the enlarged number of blind detections $$\left\lfloor \frac{(M-L) \times N}{P} \right\rfloor$$

will be allocated to one aggregation level under the UE-specific search space, i.e. each aggregation which the enlarged number of blind detections is allocated to will increase $$A = \left\lfloor \frac{\left\lfloor \frac{(M-L) \times N}{P} \right\rfloor}{H \times B} \right\rfloor$$

or $$A = \left\lfloor \frac{\frac{(M-L) \times N}{P}}{H \times B} \right\rfloor \text{PDCCH}$$

candidates on the basis of not carrying out cross carrier scheduling originally, wherein H is equal to 1, and B is the number of DCI formats included under each transmission mode. One aggregation level can be any one of aggregation levels 1, 2, 4 and 8, for example, allocating it to aggregation level 1, as shown in Table 9:

TABLE 9

| Type | Search space $S_k^{(L)}$ Aggregation level L | Size [in CCEs] | Number of PDCCH candidates $M^{(L)}$ |
|---|---|---|---|
| UE-specific | 1 | 6 + A | 6 + A |
|  | 2 | 12 | 6 |
|  | 4 | 8 | 2 |
|  | 8 | 16 | 2 |
| Common | 4 | 16 | 4 |
|  | 8 | 16 | 2 |

When the above method is used to enlarge the search space, if downlink component carrier A can carry out cross carrier scheduling, the user equipment detects the downlink control information corresponding to all or part of the downlink component carriers which can be scheduled by the downlink component carrier A in the enlarged search space of the downlink component carrier A.

In particular, the downlink component carrier A has to detect all the downlink control information which can be scheduled in the enlarged search space. For example, M=4, L=2, P=2, the downlink component carriers are a, b, c, and d respectively, wherein a and b can carry out cross carrier scheduling. Assuming that when the search space of a is carrying out single carrier scheduling, the size of the search space is X. When carrying out cross carrier scheduling, a can schedule c and d, and the search space of a is enlarged as 2X, and enlarged search space 2X is the search spaces of a, c and d, wherein the enlarged search space is X. When detecting the downlink control information, it needs to carry out detection by using the DCI formats corresponding to a, c and d in the enlarged search space 2X.

In this case, the downlink control information corresponding to all of or part of the downlink component carriers which can be scheduled by the downlink component carrier A is sent by the base station in the enlarged search space of the downlink component carrier A Embodiment II If the UE DL Component Carrier Set and the PDCCH Monitoring Set are unequal in size, the number h of carriers which can be scheduled by each downlink component carrier which can carry out cross carrier scheduling is acquired, wherein these h carriers include the carrier itself, and the search space of the downlink component carrier which can carry out cross carrier scheduling is enlarged to h search spaces, wherein there is an one-to-one correspondence between the enlarged h search spaces and the h downlink component carriers.

The locations of the h search spaces are continuous, or the starting locations of the h search spaces are produced according to the downlink component carrier index corresponding to the search space.

If the h search spaces are produced according to the downlink component carrier index corresponding to the search space, when carrying out DCI detection, the user equipment needs to determine the starting locations of h carrier search spaces according to the downlink component carrier index and then carry out DCI detection.

For example, M=4, L=1, P=1, the downlink component carriers are a, b, c, and d respectively, wherein a can carry out cross carrier scheduling. Assuming that when the search space of a is carrying out single carrier scheduling, the size of the search space is X. When carrying out cross carrier scheduling, a can schedule b, c and d, and the search space of a is 4X, wherein the enlarged search space 3X is the search spaces of b, c and d, and there is an one-to-one correspondence between the enlarged search space and the carriers. For example, the search spaces are numbered as 1-4X, wherein 1-X is the search space of a, X+1-2X is the search space of b, 2X+1-3X is the search space of c, and 3X+1-4X is the search space of d. When detecting downlink control information, in each search space with the size thereof being X, the DCI format corresponding to the search space is used for detection, for example, X+1-2X is the search space of b, then the DCI format of b is only utilized for detection in this search space, as compared to employing all the DCI formats for detection in each search space in embodiment I, the number of detections of DCI format is reduced.

In this case, the downlink control information corresponding to the downlink component carrier Y which can be scheduled by the downlink component carrier a is sent by the base station by way of the search space corresponding to the downlink component carrier Y enlarged by the downlink component carrier a, and the downlink component carrier Y is any one of h downlink component carriers which can be scheduled by downlink component carrier a.

When carrying out cross carrier scheduling in this scenario, the search space of the component carrier itself which the cross carrier scheduling is carried out on can be utilized for carrying out PDCCH blind detection, then it is more convenient to allocate the blind detection space and at the same time the implementation complexity can be reduced.

According to the above detection method, the device for detecting downlink control information in the embodiments of the present invention is applied in the user equipment, the device is configured to: during cross carrier scheduling, determine a search space for monitoring a physical downlink control channel (PDCCH) according to the number of downlink component carriers in a PDCCH Monitoring Set and the number of downlink component carriers in a UE DL Component Carrier Set.

The device can be configured to: if the number of downlink component carriers in the PDCCH Monitoring Set and the number of downlink component carriers in the UE DL Component Carrier Set are equal, set the search space for monitoring the PDCCH to be consistent with that the search space for single carrier scheduling; and if the number of downlink component carriers in the PDCCH Monitoring Set and the number of downlink component carriers in the UE DL Component Carrier Set are unequal, enlarge the search space for monitoring the physical downlink control channel (PDCCH) on carriers which can carry out cross carrier scheduling.

In this case, the enlarged search space is a user-specific search space.

The device can be configured to: enlarge equal search space for each downlink component carrier which carries out cross carrier scheduling in the PDCCH Monitoring Set.

The enlarged search space is determined by the enlarged number of times of monitoring of the downlink component carrier which can carry out cross carrier scheduling, wherein the enlarged number of times of monitoring is determined according to difference between the number of the downlink component carriers in the PDCCH Monitoring Set and the number of the downlink component carriers in the UE DL Component Carrier Set.

The enlarged number of times of monitoring is $$\left\lfloor \frac{(M-L) \times N}{P} \right\rfloor,$$

wherein, M is the number of downlink component carriers in the UE DL Component Carrier Set, L is the number of downlink component carriers in the PDCCH Monitoring Set, P is the number of downlink component carriers which can carry out cross carrier scheduling in the PDCCH Monitoring Set, and N is the maximum number of times of monitoring of each downlink component carrier when the cross carrier scheduling is not carried out.

The device can be configured to: allocate the search space corresponding to the enlarged number of times of monitoring to each downlink component carrier which can carry out cross carrier scheduling is implemented by way of the following method:

selecting H aggregation levels from the aggregation levels 1, 2, 4 and 8 in the UE-specific search space, and adding A PDCCH candidates in each selected aggregation level respectively, $$A = \left\lfloor \frac{\left\lfloor \frac{(M-L) \times N}{P} \right\rfloor}{H \times B} \right\rfloor$$

or $$A = \left\lfloor \frac{\frac{(M-L) \times N}{P}}{H \times B} \right\rfloor$$

wherein H∈ {1, 2, 3, 4}, B is the number of downlink control information formats (DCI format) under each transmission mode.

The device can be further configured to: if downlink component carrier A can carry out cross carrier scheduling, detect the downlink control information corresponding to all or part of the downlink component carriers which can be scheduled by the downlink component carrier A in the enlarged search space of the downlink component carrier A.

the downlink control information corresponding to all or part of the downlink component carriers which can be scheduled by the downlink component carrier A is sent by the base station in the enlarged search space of the downlink component carrier A.

The device can be configured to: if the downlink component carrier b can carry out cross carrier scheduling and can schedule h downlink component carriers, enlarge the search space of the carrier to h search spaces, wherein there is an one-to-one correspondence between the enlarged h search spaces and the h downlink component carriers.

In this case, the locations of the h search spaces are continuous, or the locations of the h search spaces are produced according to the downlink component carrier index corresponding to the search space.

The device can be further configured to: detect the downlink control information of the downlink component carrier corresponding to the search space in the enlarged search space.

The downlink control information of the downlink component carrier Y is sent by a base station by way of the search space corresponding to the downlink component carrier Y after the downlink component carrier b is enlarged, wherein the downlink component carrier Y is any one of the h downlink component carriers.

Those skilled in the art shall understand that all or part of the steps in the above methods can be completed through programs instructing relevant hardware, and the programs can be stored in a computer readable storage medium, such as read only memory, magnetic disk, or optical disk, etc. Optionally, all or part of the steps of the above embodiments can also be implemented by using one or more integrated circuits. Accordingly, the respective module/unit in the above embodiments can be implemented in the form of hardware or software function module. The present invention is not limited to any particular form of combination of hardware and software.

Although the present invention is described in conjunction with specific embodiments, those skilled in the art can make modification and change without departing from the spirit or scope of the present invention. Such modification and change are viewed as being within the scope of the present invention and the scope of the appended claims.

INDUSTRIAL APPLICABILITY

The present invention provides a method and device for detecting downlink control information, in which the search space for monitoring PDCCH is determined according to the number of downlink component carriers in the PDCCH Monitoring Set and in the UE DL Component Carrier Set so as to carry out blind detection on PDCCH.

What is claimed is:

1. A method for detecting downlink control information, comprising:
during cross carrier scheduling, user equipment (UE) determining a search space for monitoring a physical downlink control channel (PDCCH) according to a number of downlink component carriers in a PDCCH Monitoring Set and a number of downlink component carriers in a UE DL Component Carrier Set;
wherein the step of determining the search space for monitoring the PDCCH comprises:
if the number of downlink component carriers in the PDCCH Monitoring Set and the number of downlink component carriers in the UE DL Component Carrier Set are unequal, enlarging the search space for the user equipment to monitor the PDCCH on carriers which can carry out cross carrier scheduling.

2. The method according to claim 1, wherein
the step of determining the search space for monitoring the PDCCH further comprises:
if the number of downlink component carriers in the PDCCH Monitoring Set and the number of downlink component carriers in the UE DL Component Carrier Set are equal, the search space for the user equipment to monitor the PDCCH being consistent with search space for single carrier scheduling.

3. The method according to claim 1, wherein
the enlarged search space is a user-specific search space.

4. The method according to claim 1, wherein
the step of enlarging the search space for the user equipment to monitor the PDCCH on carriers which can carry out cross carrier scheduling comprises: if downlink component carrier b can carry out cross carrier scheduling and can schedule h downlink component carriers, enlarging the search space of the downlink component carrier b to h search spaces, wherein there is an one-to-one correspondence between the h search spaces and the h downlink component carriers.

5. The method according to claim 4, wherein
locations of the h search spaces are continuous, or the locations of the h search spaces are produced according to a downlink component carrier index corresponding to the search space.

6. The method according to claim 5, further comprising:
the user equipment detecting the downlink control information of the downlink component carrier corresponding to the search space on the enlarged search space.

7. The method according to claim 6, after enlarging the search space of the downlink component carrier b to h search spaces, further comprising:
a base station sending the downlink control information of downlink component carrier Y by way of the search space corresponding to the downlink component carrier Y, wherein the downlink component carrier Y is any one of the h downlink component carriers.

8. The method according to claim 4, further comprising:
the user equipment detecting the downlink control information of the downlink component carrier corresponding to the search space on the enlarged search space.

9. The method according to claim 8, after enlarging the search space of the downlink component carrier b to h search spaces, further comprising:
a base station sending the downlink control information of downlink component carrier Y by way of the search space corresponding to the downlink component carrier Y, wherein the downlink component carrier Y is any one of the h downlink component carriers.

10. A device for detecting downlink control information, applied in user equipment,
the device being configured to: during cross carrier scheduling, determine a search space for monitoring a physical downlink control channel (PDCCH) according to a number of downlink component carriers in a PDCCH Monitoring Set and a number of downlink component carriers in a UE DL Component Carrier Set;
wherein the device is further configured to: if the number of downlink component carriers in the PDCCH Monitoring Set and the number of downlink component carriers in the UE DL Component Carrier Set are unequal, enlarge the search space for monitoring the PDCCH on carriers which can carry out cross carrier scheduling.

11. The device according to claim 10, wherein
the device is further configured to: if the number of downlink component carriers in the PDCCH Monitoring Set and the number of downlink component carriers in the UE DL Component Carrier Set are equal, set the search space for monitoring the PDCCH to be consistent with the search space for single carrier scheduling.

12. The device according to claim 10, wherein
the enlarged search space is a user-specific search space.

13. The device according to claim 10, wherein
the device is configured to: if downlink component carrier b can carry out cross carrier scheduling and can schedule h downlink component carriers, enlarge the search space of the downlink component carrier b to h search spaces, wherein there is an one-to-one correspondence between the h search spaces and the h downlink component carriers.

14. The device according to claim 13, wherein
locations of the h search spaces are continuous, or the locations of the h search spaces are produced according to a downlink component carrier index corresponding to the search space.

15. The device according to claim 14, wherein
the device is further configured to: detect the downlink control information of the downlink component carrier corresponding to the search space on the enlarged search space, wherein
the downlink control information of downlink component carrier Y is sent by a base station by way of the search space corresponding to the downlink component carrier Y, and the downlink component carrier Y is any one of the h downlink component carriers.

16. The device according to claim 13, wherein
the device is further configured to: detect the downlink control information of the downlink component carrier corresponding to the search space on the enlarged search space, wherein
the downlink control information of downlink component carrier Y is sent by a base station by way of the search space corresponding to the downlink component carrier Y, and the downlink component carrier Y is any one of the h downlink component carriers.

\* \* \* \* \*